US009565272B2

(12) United States Patent
Momtahan et al.

(10) Patent No.: US 9,565,272 B2
(45) Date of Patent: *Feb. 7, 2017

(54) CONTENT CAPABILITY CLEARING HOUSE SYSTEMS AND METHODS

(71) Applicant: Bridgewater Systems Corp., Ottawa (CA)

(72) Inventors: Parham Momtahan, Ottawa (CA); Mark Jones, Ottawa (CA)

(73) Assignees: Amdocs Development Limited, Limassol (CY); Amdocs Canadian Managed Services Inc., Mississauga (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,233

(22) Filed: Nov. 19, 2014

(65) Prior Publication Data

US 2015/0081843 A1  Mar. 19, 2015

Related U.S. Application Data

(63) Continuation of application No. 14/316,701, filed on Jun. 26, 2014, now Pat. No. 8,929,383, which is a (Continued)

(51) Int. Cl.
*H04L 29/08* (2006.01)
*H04L 12/54* (2013.01)
(Continued)

(52) U.S. Cl.
CPC ........ *H04L 67/32* (2013.01); *H04L 12/5695* (2013.01); *H04L 47/15* (2013.01); *H04L 47/785* (2013.01);
(Continued)

(58) Field of Classification Search
None
See application file for complete search history.

(56) References Cited

U.S. PATENT DOCUMENTS

7,054,661 B1 * 5/2006 Kohli et al. ............... 455/560
7,478,065 B1 * 1/2009 Ritter et al. ............... 705/39
(Continued)

*Primary Examiner* — Christopher Crutchfield
*Assistant Examiner* — Tito Pham
(74) *Attorney, Agent, or Firm* — Zilka-Kotab, PC (57) ABSTRACT

A content capability clearing house that can act as a trusted and neutral mediator among network providers to manage rich content capabilities among multiple networks is provided. Content capabilities that can be brokered include, but are not limited to, quality of service and content screening. In an embodiment, a content capability clearing house includes a receiver that receives content capability request messages and other messages from network providers. A content capability request message includes a quality of service request and/or a subscriber profile request for use with content screening and subscriber specific advertisements. The present invention includes a series of methods for determining content capabilities for data transmission over a transaction between a content provider and a subscriber in which a content capability clearing house is used to efficiently broker and manage the capability among multiple network providers.

18 Claims, 6 Drawing Sheets

Related U.S. Application Data continuation of application No. 13/551,536, filed on Jul. 17, 2012, now Pat. No. 8,798,083, which is a continuation of application No. 11/504,703, filed on Aug. 16, 2006, now Pat. No. 8,259,623.

(60) Provisional application No. 60/797,377, filed on May 4, 2006.

(51) Int. Cl.
*H04L 12/801* (2013.01)
*H04L 12/915* (2013.01)
*H04L 12/927* (2013.01)

(52) U.S. Cl.
CPC ........... *H04L 47/805* (2013.01); *H04L 47/808* (2013.01); *H04L 67/141* (2013.01); *H04L 67/16* (2013.01); *H04L 67/306* (2013.01); *H04L 67/322* (2013.01); *H04L 67/327* (2013.01)

(56) References Cited

U.S. PATENT DOCUMENTS

| | | | |
|---|---|---|---|
| 2002/0041590 A1* | 4/2002 | Donovan | 370/352 |
| 2002/0138601 A1* | 9/2002 | Piponius et al. | 709/223 |
| 2003/0182429 A1* | 9/2003 | Jagels | 709/227 |
| 2005/0188415 A1* | 8/2005 | Riley | 725/116 |
| 2005/0195854 A1* | 9/2005 | Agmon | H04L 12/2859 370/465 |
| 2006/0031882 A1* | 2/2006 | Swix et al. | 725/46 |
| 2006/0116912 A1* | 6/2006 | Maes | 705/4 |
| 2009/0019163 A1* | 1/2009 | Pecus | 709/226 |

* cited by examiner

CONTENT CAPABILITY CLEARING HOUSE SYSTEMS AND METHODS

CROSS REFERENCE TO RELATED APPLICATIONS

The present application is a continuation of U.S. application Ser. No. 14/316,701, filed Jun. 26, 2014, which is a continuation of U.S. application Ser. No. 13/551,536, filed Jul. 17, 2012, which is a continuation of U.S. application Ser. No. 11/504,703, filed Aug. 16, 2006, which claims priority to U.S. Provisional Patent Application No.: 60/797,377, entitled Content Capability Broker Systems and Methods, filed on May 4, 2006 by Momtahan et. al., which are hereby expressly incorporated by reference in their entirety.

BACKGROUND OF THE INVENTION

Field of the Invention

The present invention relates to content distributed over a communications network, and more particularly, to a content capability clearing house.

Background of Invention

The distribution and use of high quality, high definition, bandwidth intensive content over a communications network continues to grow in importance. For example, the distribution of video and flash-based content, including conferencing, over the Internet has seen explosive recent growth. The distribution of rich content occurs over wireless and wireline networks via the Internet and other types of data networks.

Existing content distribution architectures typically do not ensure QoS and are based on peer-to-peer networking. Furthermore, while some content distribution architectures refer to content brokers, these content brokers are providing a central content repository within a single network provider or with a peer network provider. They are not serving as content brokers that function as a clearinghouse between multiple service providers. More precisely, they do not serve as a facilitator to establish a network connection between an end user using one network provider and another network provider or content provider, such that the user can access content services at a particular QoS level.

For example, U.S. Published Patent Application No.: 2004/0148344, entitled Content Distribution Architecture, filed by Navar et al., ("Navar Patent Application") discloses a cached media distribution system that employs the Internet. In the system disclosed within the Navar Patent Application, content is harvested and stored from multiple disparate sources. Navar Patent Application Abstract. Specifically, content is stored on distributed content servers and a content broker tracks where the content is stored. Id. at ¶48 In this case, when a request for a certain type of content is received, the content broker directs the requester to a content server, which has pre-arranged content—rather than to a network provider—with the appropriate QoS available at the appropriate cost. Id. at ¶54. Harvesting and storing pre-arranged content in the context of the overall Internet is simply not feasible, and would limit end users ability to access the wide diversity of content available over the Internet.

Furthermore, content providers want to ensure premium end user experiences when end users are using or viewing their content. Traditional content providers include entertainment and gaming providers. Additionally, enterprise content providers are increasingly using the Internet to provide business promotion content (e.g., video ads promoting the release of a new automobile), training, communications and conferencing services.

The vast majority of the time, when a user requests content, a number of network providers are involved in transmitting that content from the content provider to the end user. For example, when an end user accesses the PLAYHOUSE DISNEY website for interactive videos and games, the content may traverse network facilities operated by several network providers, such as Verizon, AT&T, and the like.

A best-effort Internet approach often does not provide an adequate quality of service ("QoS") level for the distribution of rich content. Furthermore, content providers increasingly desire to prevent access to certain content. For example, a content provider supporting a pornographic website might want to more effectively screen youths from accessing pornographic videos for downloading than current approaches based on credit cards and the like. Furthermore, multi-protocol switching ("MPLS") and other virtual private networks ("VPNs") may be able to provide adequate solutions with respect to quality of service in situations where a single network provider supports the content transmission. However, MPLS and other VPN solutions are likely to be too complex and expensive to control content capability (e.g., quality of service or content screening) when multiple network providers are involved.

The existing solutions for providing end-to-end quality of service, and other content capabilities, where multiple network providers are involved in the content flow, require methods negotiated and implemented pair-wise between the network providers. Pair-wise methods become costly and complex with increasing number of network providers involved in global coverage of communications services.

For example, U.S. Published Patent Application No.: 2004/0-139088, entitled Method for Achieving End-to-End Quality of Service Negotiations for Distributed Multi-Media Applications, filed by Mandato et al. ("Mandato Application"), discloses a framework for achieving dynamic end-to-end QoS negotiation and control coordination for distributed multimedia applications. The Mandato Application notes that "the establishment of a QoS-enabled communication session can be accomplished in a multi-step process, starting with negotiation of QoS aspects on an end-to-end basis." Mandato Application at ¶92. The approach described in the Mandato Application requires each provider to negotiate with every other provider. As discussed above, such a pair-wise approach can quickly become cumbersome and inefficient.

What are needed are cost effective systems and methods for providing end-to-end rich content capabilities, such as quality of service and content screening, when multiple network providers are involved in the data path.

SUMMARY OF THE INVENTION

The present invention provides a content capability clearing house that can act as a trusted and neutral mediator among network providers to manage rich content capabilities among multiple networks. Content capabilities that can be brokered include, but are not limited to, quality of service and content screening. In an embodiment, a content capability clearing house includes a receiver that receives content capability request messages and other messages from network providers. A content capability request message includes a quality of service request and/or a subscriber profile request for use with content screening and subscriber specific advertisements. An example of content capability is quality of service in terms of bandwidth, delay, jitter and loss tolerance required by the content provider to offer a compelling experience to the content user.

A content capability clearing house also includes a policy decision module that associates a network profile with a subscriber identifier and a transmitter that transmits content capability request messages and other types of messages.

A content capability clearing house further includes a network profile database that contains information about the network providers that are associated with the content capability clearing house and a subscriber profile database that includes subscriber information related to subscribers of the network providers that are associated with the content capability clearing house. The content capability clearing house includes a transaction identification module for uniquely identifying each transaction.

In another embodiment, a content capability clearing house includes a subscriber preference module and a content tracking repository. The content tracking repository stores viewing history information for subscribers, while the subscriber preference module analyzes the content tracking repository to provide subscriber profile information to content providers for the placement of customer tailored advertisements.

The present invention includes a series of methods for determining content capabilities for data transmission over a transaction between a content provider and a subscriber in which a content capability clearing house is used to efficiently broker and manage the capability among multiple network providers.

The present invention provides cost effective systems and methods for providing end-to-end rich content capabilities, such as quality of service and content screening, when multiple network providers are involved in the data path.

Furthermore, in the absence of the present invention significant administrative and technical complexity would exist to ensure content capabilities (e.g., guaranteed quality of service across a connection involving multiple network providers) for data transmission involving multiple network providers. Specifically, network providers would need to have agreements in place with many other network providers in an effort to try to ensure a particular content capabilities. For example, network providers would need to have $n^2$ bilateral agreements, whereas using the present invention only n agreements would need to be in place between a content capability clearing house and network providers.

Another benefit of a content capability clearing house is that it provides an efficient way for tracking subscriber access to information and content that can be analyzed to provide subscriber specific tailored advertisements. In the absence of the content capability clearing house, such a capability is not feasible as there would need to be tracking by each network provider across traffic that that network provider has exchanged with every other network provider. Furthermore, given privacy concerns and the marketing value of subscriber usage information it would be unlikely that network providers would cooperate with one another. In this regard, the content capability clearing house can serve as a neutral third party to the benefit of all network providers involved without compromising valuable subscriber usage data.

Further embodiments, features, and advantages of the invention, as well as the structure and operation of the various embodiments of the invention are described in detail below with reference to accompanying drawings.

BRIEF DESCRIPTION OF THE FIGURES

The present invention is described with reference to the accompanying drawings. In the drawings, like reference numbers indicate identical or functionally similar elements. The drawing in which an element first appears is indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
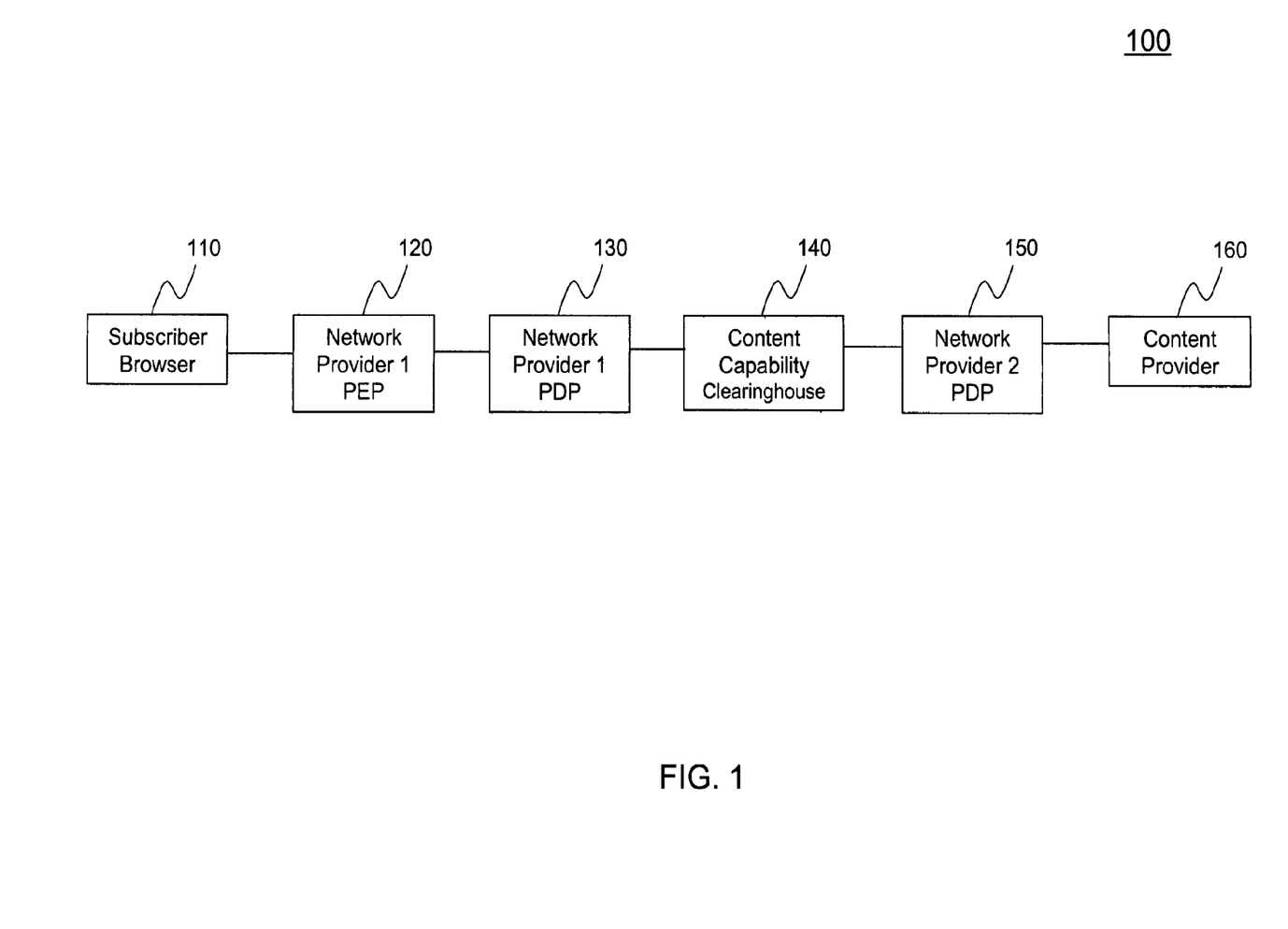
FIG. 1 provides a block diagram of a network having a content capability clearing house, according to an embodiment of the invention.

FIG. 1 provides a block diagram of network 100 having content capability clearing house 140, according to an embodiment of the invention. Network 100 includes subscriber browser 100, network provider 1 policy enforcement point (PEP) 120, network provider 1 policy decision point (PDP) 130, content capability clearing house 140, network provider 2 policy decision point (PDP) 150 and content provider 160.

Subscriber browser 100 provides the interface for an end user to access content via the Internet or other data network. For example, subscriber browser 100 can include, but is not limited to, a web browser such as MICROSOFT EXPLORER. User of subscriber browser 100 is illustrative only. Other means of accessing content can be used, for example, a gaming interface or an I-Tunes interface.

Network provider 1 PEP 120 can include a packet inspector or router that enforces policy decisions regarding traffic transmitted through network provider 1. PEP 120 can enforce policies including, but not limited to, Diffsery methods. Network provider 1 provides network connectivity to subscriber browser 100.

Network provider 1 PDP 130 provides and implements policy decisions for messages transmitted over network provider 1's network, such as whether the network will permit a message to traverse its network, as will be known by individuals skilled in the relevant arts. Network provider 1 PDP 130 is coupled to network provider PEP 120. Based on defined policies, PDP 130 can translate and incoming request from clearing house 140 into policies that include, but are not limited to, Diffsery code points also known as type-of-service ("TOS") bytes for PEP 120.

Content capability clearing house 140 enables a system where member network providers, such as network providers 1 and 2, can provide enhanced rich content delivery services in an efficient manner. Content capability clearing house 140 can provide billing and other administration functions in such an environment. Content capability clearing house 140 is coupled to network provider 1 PDP 130.

Network provider 2 PDP 150 provides and implements policy decisions for messages transmitted over network provider 2's network. Network provider 2 PDP 150 is coupled to content capability clearing house 140.

Content provider 160 provides content to an end user. For example, content provider 160 could include traditional content providers that provide online entertainment and gaming, or can include enterprise content providers. A content portal will typically provide the content for content provider 160. Example content might include a video displayed over the Internet. Network provider 2 provides network connectivity to content provider 160. Specifically, content provider 160 is coupled to network provider 2 PDP 160.

Wireless or wireline connections can be used for each of the connections between network elements. Any combination of wireless or wireline connections can be supported.

The use of content capability clearing house 140 provides numerous benefits. Specifically, an end user or subscriber of content can efficiently receive the content experience required or desired by a content provider within the capabilities of network providers. Furthermore, a content provider only gets charged when an end user gets the requested content experiences. The network provider where the end user accesses content, for example, network provider 1, gets appropriate compensation for providing the appropriate content capability, such as a requested quality of service. The network provider serving the content provider, such as network provider 2, can invoice the content provider for providing an end-to-end service with specified quality of service or other content capabilities.

Within this model, content capability clearing house 140 provides inter network signaling, charging and management of settlements. Additionally, content capability clearing house 140 is uniquely positioned to broker user profiles for content control using content ratings (e.g., Entertainment Software Rating Board ratings for video games) and similar means. Finally, content capability clearing house 140 can develop user profiles based on a user historical access to content. Using the profiles, content capability clearing house 140 can provide advertisements and other services tailored to a particular user's interest.

Figure 2:
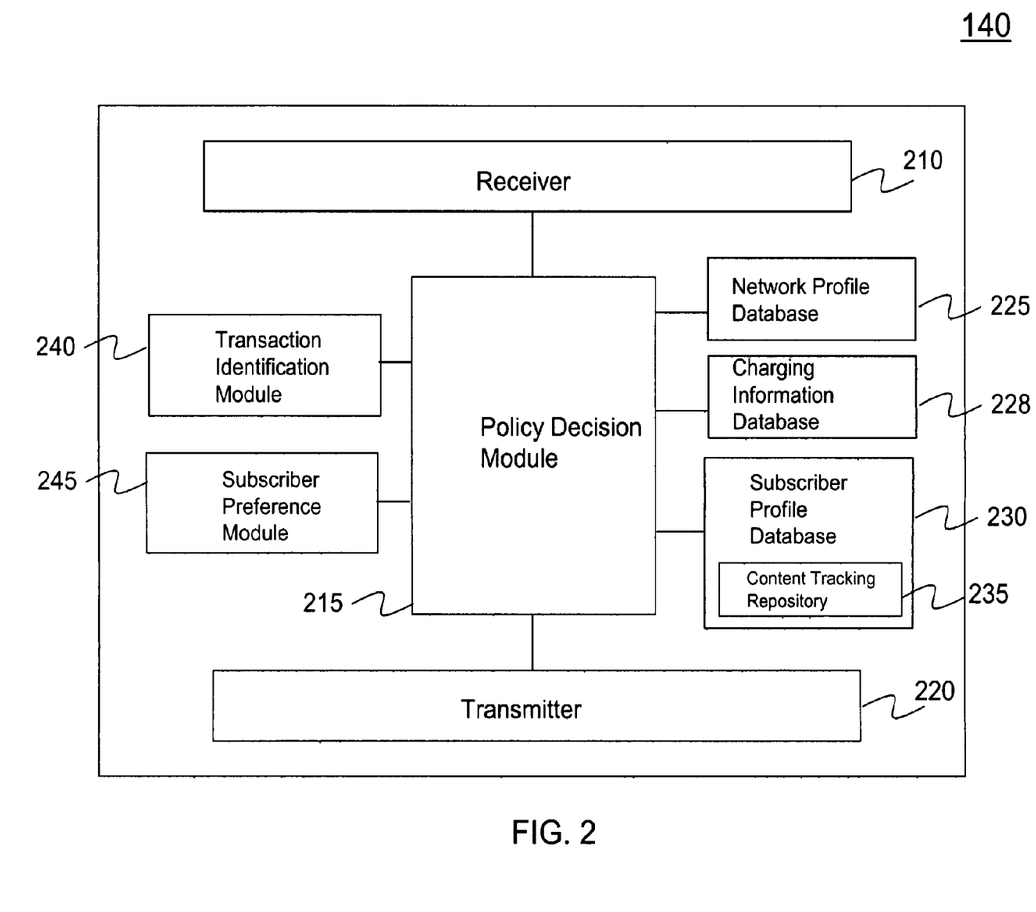
FIG. 2 provides a block diagram of a content capability clearing house, according to an embodiment of the invention.

FIG. 2 provides a block diagram of content capability clearing house 140, according to an embodiment of the invention. Content capability clearing house 140 includes receiver 210, policy decision module 215, transmitter 220, network profile database 225, charging information database 228, subscriber profile database 230, content tracking repository 235, transaction identification module 240 and subscriber preference module 245.

Receiver 210 receives content capability request messages from network providers (not shown). A content capability request message can include a quality of service request, for example, a request for a certain guaranteed transmission speed or a request for a maximum number of transmission error. Additionally, a content capability request message can include a viewer profile request, such as a request to view rated content. Receiver 210 can receive other types of messages to support content capability requests and tailored advertisements and messaging.

Policy decision module 215 associates a network profile with a subscriber identifier. When receiver 210 receives a content capability request, receiver 210 transmits the request to policy decision module 215. In one embodiment, networks can be associated with specific subscribers based on the subscriber's IP address.

Transmitter 220 transmits content capability request messages that include the results provided by policy decision module 215. Transmitter 220 can transmit other types of messages to support content capability requests and tailored advertisements and messaging.

Network profile database 225 contains network capabilities and policies for many different network operators that are coupled to content capability clearing house 140.

Charging information database 228 contains service charging agreement profiles for networks within network profile database 225. Alternatively, this information can be included within network profile database 225. Charging information database 228 also stores information related to service charges for service connections that can then be used for settlements between providers. The charging agreement profiles also enable content capability clearinghouse 140 to provide methods for enforcement of policies whereby QoS and other content capabilities are only requested from other service providers if the network provider requesting a particular capability has the appropriate service charging agreement. That is, does the service charging agreement provide charging arrangements in which higher fees, for example, will be paid for a guaranteed level of QoS.

Subscriber profile database 230 contains subscriber profiles for end users that are served through content capability clearing house 140. Subscriber profile database 230 includes network associations for subscribers and information and pointers related to historical viewing habits. Subscriber profile database can also include information, such as age, used to determine whether a subscriber can view particular content.

Content tracking repository 235 includes content listings of recently viewed content for each subscriber in subscriber profile database 230. Content tracking repository 235 may also include user preference profiles that have been developed through analysis of content viewing histories. For example, if a subscriber viewed content repeatedly about fishing, the user preference profiles might associate fishing with the subscriber, so that fishing specific advertisements could be provided by the subscriber preference module 245. Either content capability clearing house 140 could provide content based on the subscriber preferences or content capability clearing house 140 could send a message to a content provider indicating what the particular subscriber's preferences are.

Transaction identification module 240 generates a unique transaction identification for each content capability message that is received. The transaction identification is associated with all other messages generated as a result of the original content capability request.

As mentioned above, subscriber preference module 245 generates subscriber preference information based on the content tracking repository information for a particular subscriber.

The modules illustrated in FIG. 2 can be implemented in any combination of software, hardware and firmware. Furthermore, the modules can be implemented within a single computer system or across multiple computer systems. For example, network profile database 225 can be implemented on one computer system, subscriber profile database 230 can be implemented on another computer system. The remaining modules could then be implemented on a third computer system.

Figure 3:
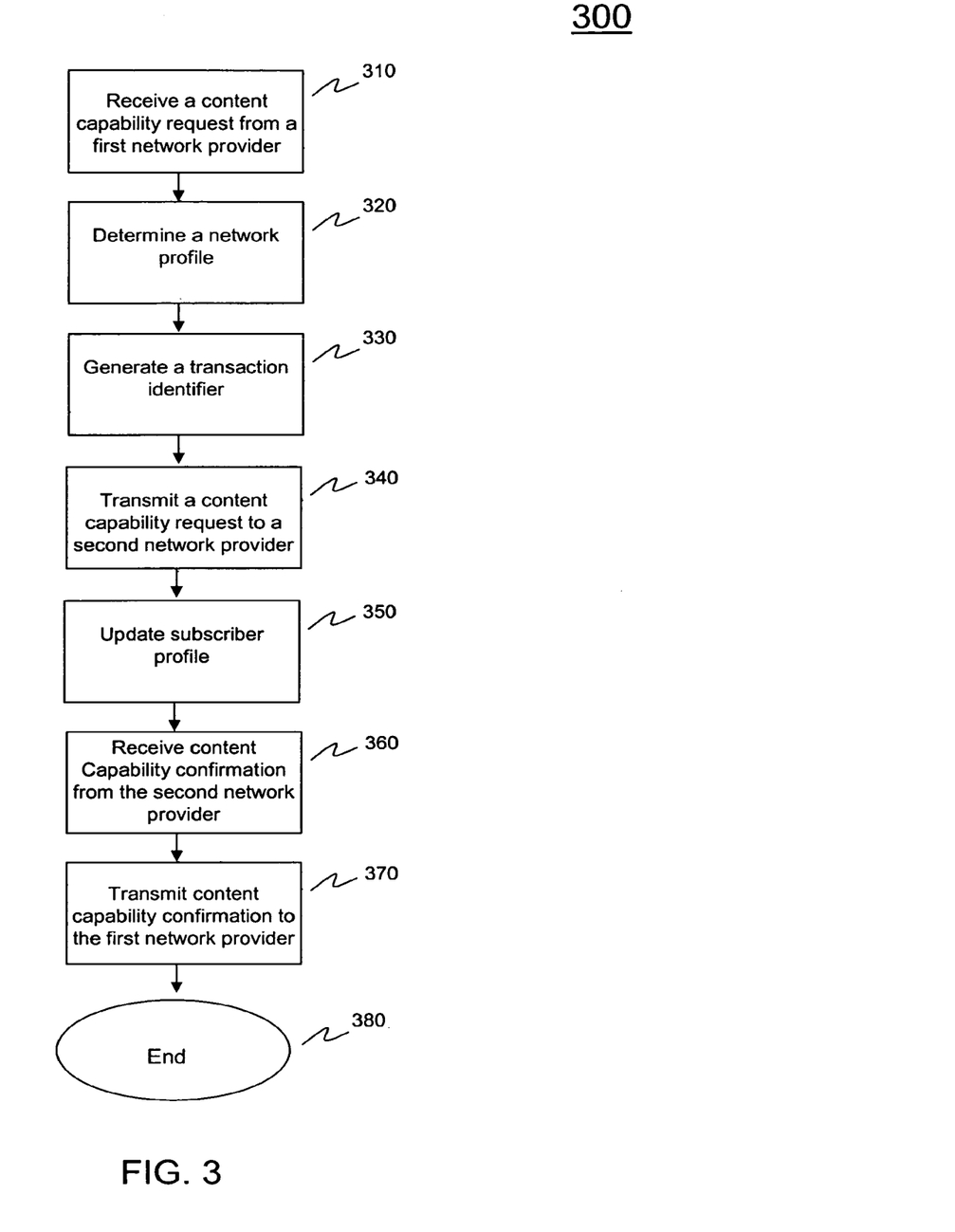
FIG. 3 provides a flowchart for a method for determining a content capability for data transmission involving a transaction between a content provider and a subscriber when multiple network providers are used to form a connection, according to an embodiment of the invention.

FIG. 3 provides a flowchart for method 300 for determining content capability for data transmission involving a transaction between a content provider and a subscriber when multiple network providers are used to form the connection, according to an embodiment of the invention. The method is provided from the perspective of a content capability clearing house, such as content capability clearing house 140.

Method 300 begins in step 310. In step 310 a content capability request is received from a first network provider. In step 320 a network profile is determined based on the subscriber profile. In an embodiment, the network profile can be determined by associating a network to a subscriber based on the subscriber IP address. Optionally, in step 330 a transaction identification is generated for the transaction. In step 340 a content capability request is transmitted to a second network provider. In an embodiment, the content capability request includes transmitting a subscriber IP address, a content category and the transaction identifier, which can be used as a charging identification. Optionally, prior to transmitting a content capability request to a second network provider, confirmation that a requesting network has an appropriate service charging agreement occurs. For example, is a user requests a specific QoS level, charging information database 228 can be accessed to validate that the requesting network provider has a service charging agreement that supports paying a premium fee for a guaranteed QoS.

Optionally, in step 350 a profile for the subscriber is updated based on the transaction. For example, the subscriber profile can be updated to indicate the type of content that was requested.

In step 360 a content capability confirmation is received from the second network provider. In step 370 a content capability confirmation is transmitted to the first network provider. The content capability confirmation confirms that the requested content capability can be provided. In step 380 method 300 ends.

Figure 4:
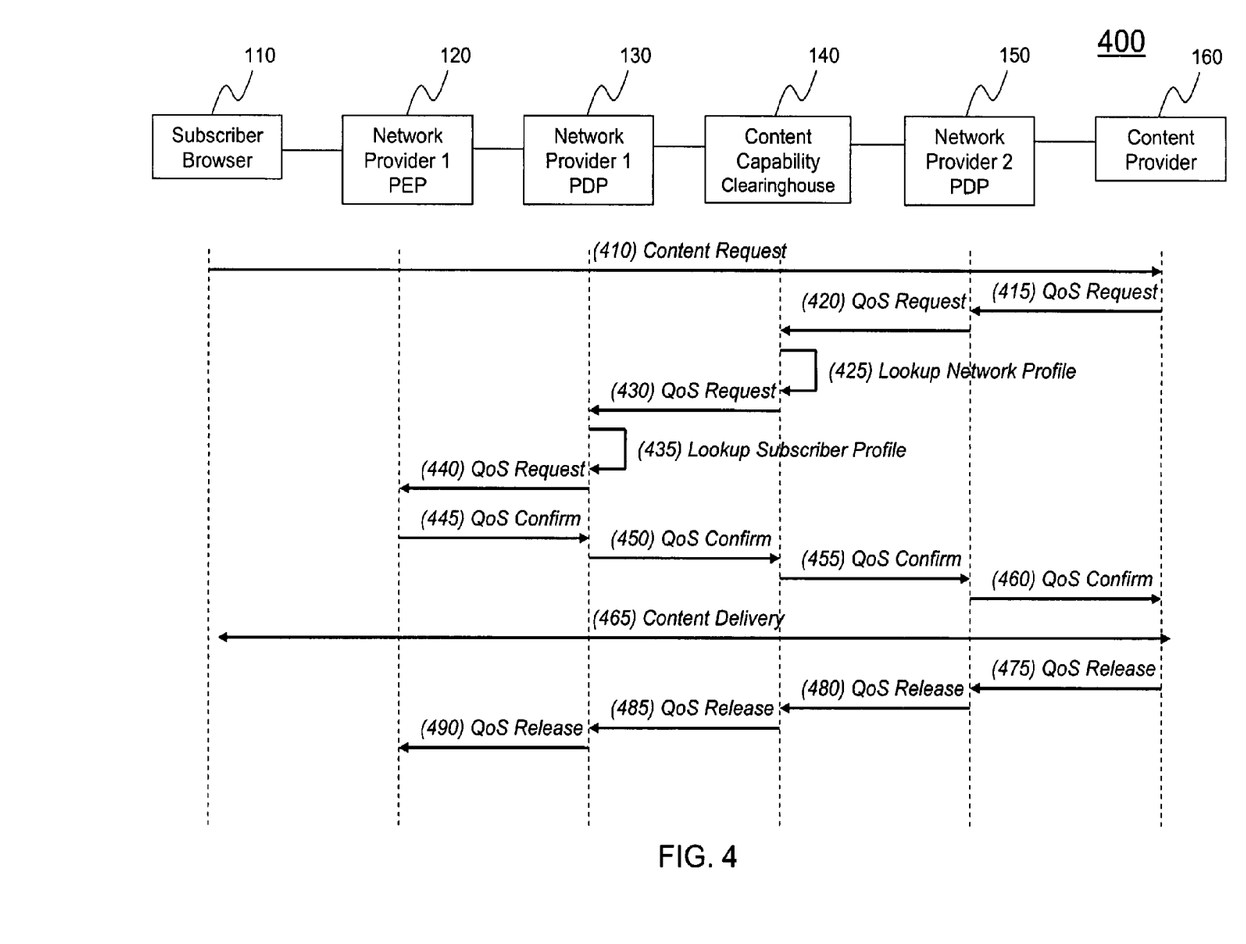
FIG. 4 provides a signaling diagram that shows the establishment of a content capability for data transmission involving a transaction between a content provider and a subscriber, according to an embodiment of the invention.

FIG. 4 provides a signaling diagram 400 that shows the establishment of a content capability for data transmission involving a transaction between a content provider and a subscriber, according to an embodiment of the invention. The signaling diagram is based on the example network provided in FIG. 1. The use of the example network of FIG. 1 is for illustration purposes only and not intended to limit the scope of the invention. In particular, a content capability clearing house can be used within a network scenario involving more than two network providers, or with only one network provider, as will be known by individuals skilled in the relevant arts based on the teachings herein.

Referring to FIG. 4, the transaction begins in step 410. In step 410, subscriber browser 110 requests content from content provider 160. For example, an end user subscriber could request content from a web page. Upon receipt of the content request, content provider 160 determines that the content owner would like to provide a certain quality of service ("QoS"). In alternative embodiments, other types of requests or information can be included, such as, for example, a content rating that could be used to determine whether a subscriber is permitted to receive the requested content.

In step 415 content provider 160 transmits a content capability request, which in this scenario is a QoS request to network provider 2 PDP 150, which provides connectivity services to content provider 160.

In step 420 network provider 2 PDP 150 validates that content provider 160 is authorized to request the QoS and transmits a QoS request to content capability clearing house 140.

In step 425 content capability clearing house 140 validates that network provider 2 is authorized to request the specified QoS, identifies the subscriber network from the subscriber's IP address, retrieves network provider 1's network policy and validates that the requested QoS is permitted.

In step 430 content capability clearing house 140 transmits a QoS request message to network provider 1 PDP 130.

In step 435 network provider 1 PDP 130 identifies the subscriber from the subscriber IP address or other means, retrieves the subscriber policy and validates that the requested QoS is allowed.

In step 440 network provider 1 PDP 130 transmits a QoS request to network provider 1 PEP 120, which can be a traffic shaper PEP, such as a deep packet inspector.

In step 445 network provider 1 PEP 120 applies the requested QoS and transmits a QoS confirmation message to network provider 1 PDP 120. In step 450 network provider 1 PDP 130 forwards the QoS confirmation message to content capability clearing house 140. In step 455 content capability clearing house 140 forwards the QoS confirmation message to network provider 2 PDP 150. Optionally, content capability clearing house 140 can record that the requested QoS transaction has been successfully established, which can later be used for billing/settlement purposes or other analysis. In step 460 network provider 2 PDP 150 forwards the QoS confirmation message to content provider 160.

In step 465 content provider 160 provides content to subscriber browser 110 at the requested QoS. Once the content has been delivered, in step 475 content provider 160 transmits a QoS release message that identifies that the content has been delivered and that the requested level of service should be released.

In step 480 network provider 2 PDP 150 forwards the QoS release message to content capability clearing house 140. In step 485 content capability clearing house 140 forwards the QoS release message to network provider 1 PDP 130. Optionally, content capability clearing house 140 can record the completion of the requested QoS transaction, which can later be used for billing purposes or other analysis. In step 490 network provider 1 PDP 130 transmits the QoS release message to network provider 1 PEP 130 to complete the transaction.

Figure 5:
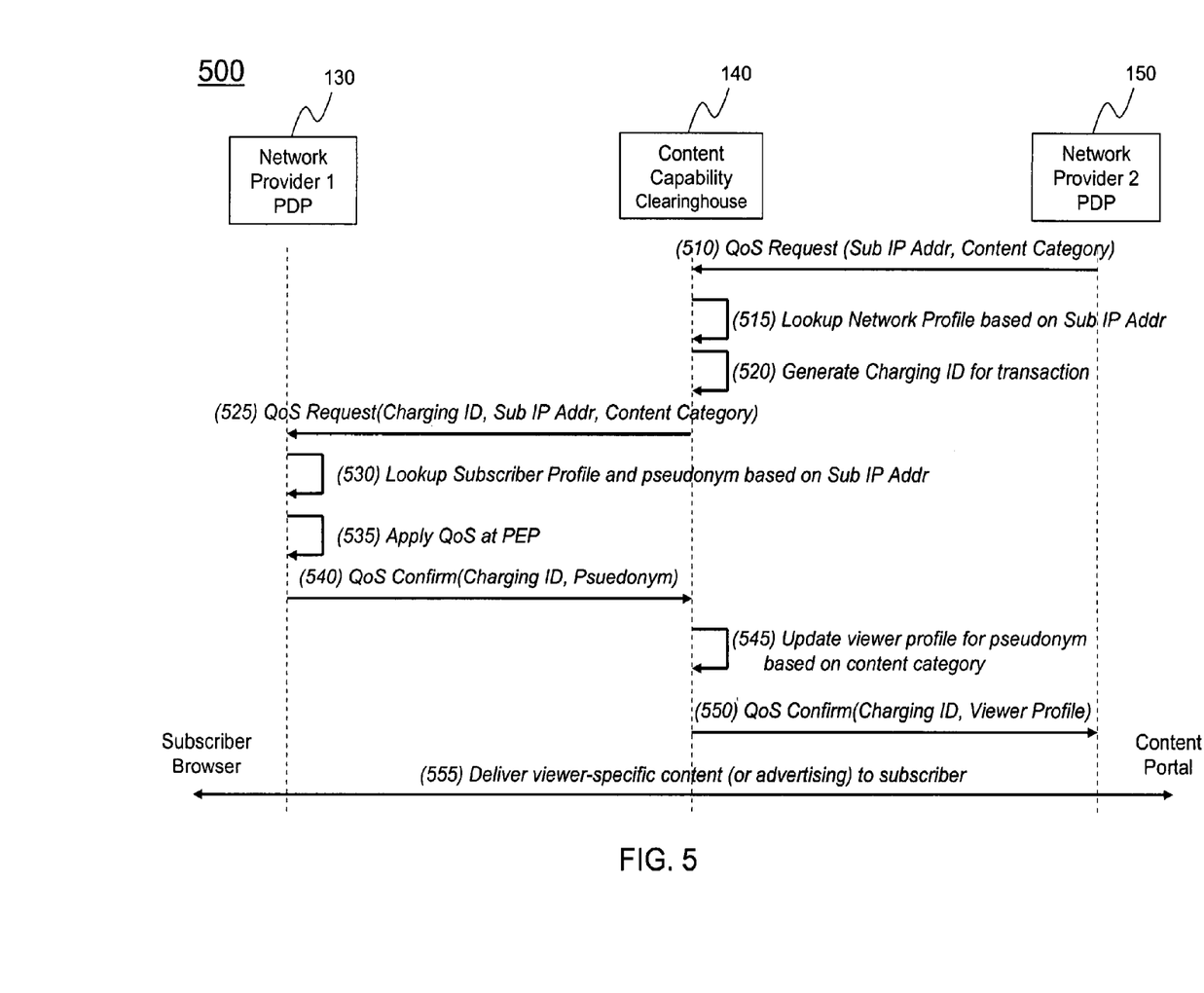
FIG. 5 provides a signaling diagram that shows the establishment of a content capability for data transmission involving a transaction between a content provider and a subscriber that involves subscriber specific advertisements, according to an embodiment of the invention.

FIG. 5 provides a signaling diagram 500 that shows the establishment of a content capability for data transmission involving a transaction between a content provider and a subscriber, according to an embodiment of the invention. The message exchange illustrated in signaling diagram 500 highlights further enhancements and considerations that can build upon the message exchange illustrated in signaling diagram 400. For ease of illustration only signaling events between network provider 1 PDP 130, content capability clearing house 140 and network provider 2 PDP 150 are shown.

In step 510 network provider 2 PDP receives a request from a content provider for enhanced QoS or for a viewer profile. In response network provider 2 PDP 150 transmits a QoS request message to content capability clearing house 140. Alternatively or in addition, network provider 2 PDP 150 can request a viewer profile within the QoS request message or transmit a separate viewer profile message.

In step 515 content capability clearing house 140 validates that network provider 2 is authorized to request the specified QoS, identifies the subscriber network from the subscriber's IP address, retrieves network provider 1's network policy and validates that the requested QoS is permitted.

In step 520 content capability clearing house 140 generates a unique transaction identifier for this transaction, which can be used by all parties to the transaction for reconciliation and dispute resolution.

In step 525 content capability clearing house 140 transmits a QoS request message to network provider 1 PDP 130. The QoS request message can include, but is not limited to, the transaction identifier, the subscriber IP address, content category and type of service being requested.

In step 530 network provider 1 PDP 130 looks up the subscriber profile and pseudonym based on the subscriber's IP address (typically using a DHCP lease query). The pseudonym is constant across all transactions and serves to protect the identity of the subscriber for privacy considerations.

In step 535 network provider 1 PDP 130 evaluates the subscriber profile to determine content suitability and whether the requested QoS can be provided.

In step 540 network provider 1 PDP 130 transmits a QoS confirmation message to content capability clearing house 140. The QoS confirmation message can include, but is not limited to, the transaction identifier and Pseudonym.

In step 545 content capability clearing house 140 updates the subscriber profile for the pseudonym based on the content category and other characteristics. As previously discussed with respect to FIG. 2, content tracking repository 235 can be used to track subscriber viewing characteristics.

In step 550 content capability clearing house 140 sends a QoS confirmation message to network provider 2 PDP 150. The QoS confirmation can include, but is not limited to the transaction identifier and subscriber profile information (e.g., the types of content category that are most interesting to a subscriber based on the contents within the content tracking repository 235 for the particular subscriber. Network provider 2 PDP 150 forwards the QoS confirmation message information to the content portal.

In step 555 a content provider receives the QoS confirmation information, evaluates the subscriber profile information and delivers the requested content. Additionally, the content provider can provide advertising that is specific to the subscriber's viewing habits based on the subscriber profile information.

For ease of illustration, the signaling diagrams of FIG. 4 and FIG. 5 illustrate two signaling scenarios that primarily focus on QoS requests. A content capability clearing house can provide other types of content capability mediation or brokering services between one or multiple networks. For example, a content capability clearing house can provide, as highlighted above, the ability to more effectively regulate the viewing of rated content. Based on the teachings herein, individuals skilled in the relevant arts will be able to ascertain other content capabilities that can be brokered by a content capability clearing house.

Computer System Implementation

Figure 6:
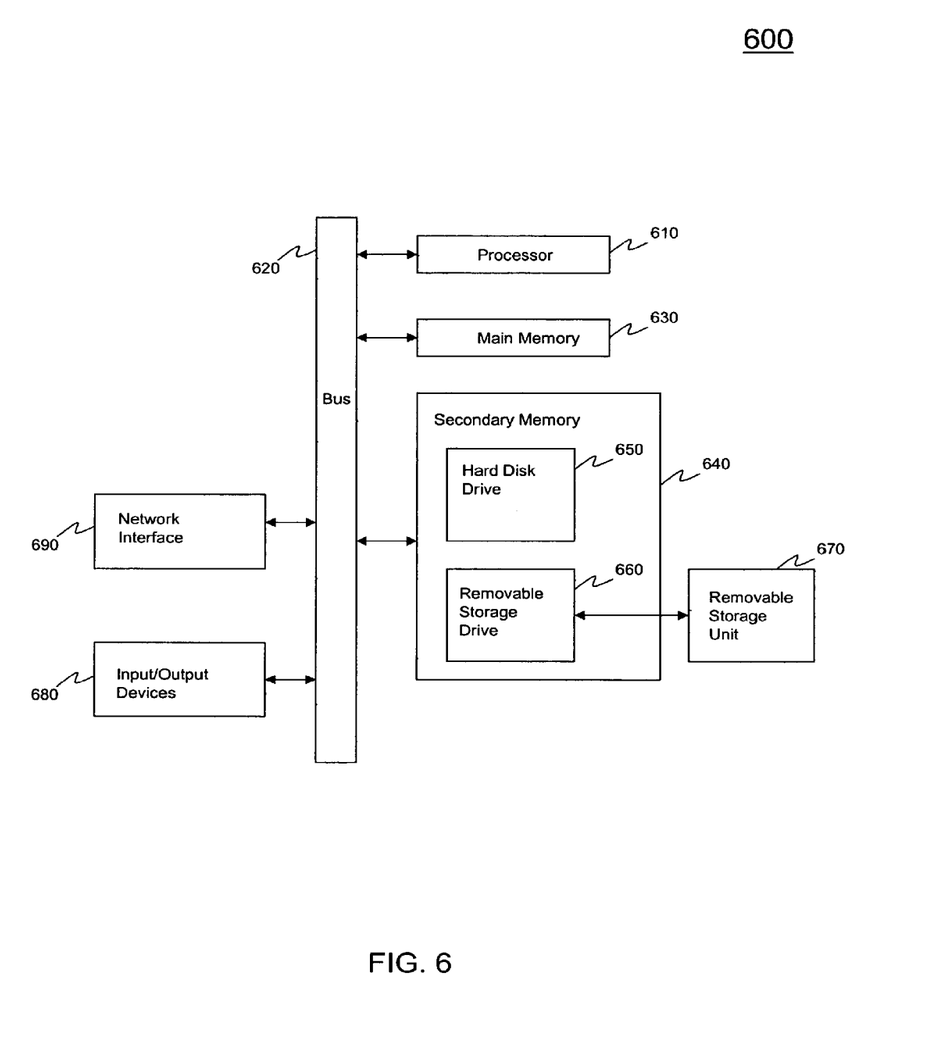
FIG. 6 is a diagram of a computer system on which the methods and systems herein described can be implemented, according to an embodiment of the invention.

In an embodiment of the present invention, the methods and systems of the present invention described herein are implemented using well known computers, such as a computer 600 shown in FIG. 6. The computer 600 can be any commercially available and well known computer capable of performing the functions described herein, such as computers available from International Business Machines, Apple, Sun, HP, Dell, Cray, etc.

Computer 600 includes one or more processors (also called central processing units, or CPUs), such as processor 610. Processor 600 is connected to communication bus 620. Computer 600 also includes a main or primary memory 630, preferably random access memory (RAM). Primary memory 630 has stored therein control logic (computer software), and data.

Computer 600 may also include one or more secondary storage devices 640. Secondary storage devices 640 include, for example, hard disk drive 650 and/or removable storage device or drive 660. Removable storage drive 660 represents a floppy disk drive, a magnetic tape drive, a compact disk drive, an optical storage device, tape backup, ZIP drive, JAZZ drive, etc.

Removable storage drive 660 interacts with removable storage unit 670. As will be appreciated, removable storage unit 660 includes a computer usable or readable storage medium having stored therein computer software (control logic) and/or data. Removable storage drive 660 reads from and/or writes to the removable storage unit 670 in a well known manner.

Removable storage unit 670, also called a program storage device or a computer program product, represents a floppy disk, magnetic tape, compact disk, optical storage disk, ZIP disk, JAZZ disk/tape, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 600, or multiple computer 600s to perform any combination of the functions described herein.

Computer programs (also called computer control logic) are stored in main memory 630 and/or the secondary storage devices 640. Such computer programs, when executed, direct computer 600 to perform the functions of the present invention as discussed herein. In particular, the computer programs, when executed, enable processor 610 to perform the functions of the present invention. Accordingly, such computer programs represent controllers of the computer 600.

Computer 600 also includes input/output/display devices 3180, such as monitors, keyboards, pointing devices, etc.

Computer 600 further includes a communication or network interface 690. Network interface 690 enables computer 600 to communicate with remote devices. For example, network interface 690 allows computer 3100 to communicate over communication networks, such as LANs, WANs, the Internet, etc. Network interface 690 may interface with remote sites or networks via wired or wireless connections. Computer 600 receives data and/or computer programs via network interface 690. The electrical/magnetic signals having contained therein data and/or computer programs received or transmitted by the computer 600 via interface 690 also represent computer program product(s).

The invention can work with software, hardware, and operating system implementations other than those described herein. Any software, hardware, and operating system implementations suitable for performing the functions described herein can be used.

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

What is claimed is:

1. A system, comprising:
a receiver separate from and in communication with a first network provider over a first network provided by the first network provider, the receiver configured to:
receive, from the first network provider over the first network, a content capability request message, wherein the content capability request message indicates that a provider of content provided network connectivity by the first network provider desires to establish an end-to-end communications path for providing a content delivery session between the content provider and a subscriber at a specified quality of service, and wherein the content capability request message includes a subscriber identifier that identifies the subscriber, wherein the subscriber is provided network connectivity over a second network provided by a second network provider;
a transmitter separate from and in communication with the second network provider over the second network provided by the second network provider, the transmitter configured to:
transmit responsive to the received content capability request message, to the second network provider over the second network, a quality of service request message that requests the specified quality of service;
the receiver further configured to:
receive, from the second network provider over the second network, a quality of service confirmation message that indicates the specified quality of service has been applied as a result of the quality of service request message;
the transmitter further configured to:
forward responsive to the received quality of service confirmation message, to the first network provider over the first network, the quality of service confirmation message, wherein the quality of service confirmation message prompts the first network provider to initiate the content delivery session at the specified quality of service;
the receiver further configured to:
receive from the first network provider over the first network a forwarded quality of service release message that originates from the content provider and indicates that the content has been delivered from the content provider, and
the transmitter further configured to:
in response to receiving the quality of service release message, forward the quality of service release message to the second network provider providing the network connectivity to the subscriber to release the specified quality of service and to record a completion of a transaction.

2. The system of claim 1, further comprising a network profile database, wherein the network profile database is configured to store network capabilities and policies for a plurality of network providers.

3. The system of claim 1, further comprising a policy decision module that associates a network profile with the received subscriber identifier, wherein the network profile includes network capabilities and policies for the second network provider of the subscriber.

4. The system of claim 3, wherein upon receipt of the content capability request message a policy decision module determines whether the second network provider of the subscriber will support the specified quality of service based on the subscriber's network profile.

5. The system of claim 1, wherein the transmitter transmits subscriber preference information in a content capability confirmation message to the content provider; wherein the subscriber preference information includes information regarding a viewing history of the subscriber.

6. The system of claim 1, further comprising a transaction identifier that generates a unique transaction identification for each content capability request message that is received.

7. The system of claim 1, further comprising a charging information database, wherein the charging information database is configured to include network provider service charging agreements.

8. The system of claim 7, wherein the charging information database is configured to record transaction information that provides for settlement of charges among network providers using the system.

9. A method, comprising:
receiving, by a system over a first network provided by the first network provider, a content capability request message, wherein the content capability request message indicates that a provider of content provided network connectivity by the first network provider desires to establish an end-to-end communications path for providing a content delivery session between the content provider and a subscriber at a specified quality of service, and wherein the content capability request message includes a subscriber identifier that identifies the subscriber, wherein the subscriber is provided network connectivity over a second network provided by a second network provider;
transmitting responsive to the received content capability request message, by the system to the second network provider over the second network, a quality of service request message that requests the specified quality of service;
receiving, by the system from the second network provider over the second network, a quality of service confirmation message that indicates the specified quality of service has been applied as a result of the quality of service request message;
forwarding responsive to the received quality of service confirmation message, by the system to the first network provider over the first network, the quality of service confirmation message, wherein the quality of service confirmation message prompts the first network provider to initiate the content delivery session at the specified quality of service;
receiving, by the system from the first network provider over the first network, a forwarded quality of service release message that originates from the content provider and indicates that the content has been delivered from the content provider; and
in response to receiving the quality of service release message, forwarding, by the system, the quality of service release message to the second network provider providing the network connectivity to the subscriber to release the specified quality of service and to record a completion of a transaction.

10. The method of claim 9, further comprising generating a transaction identification for the transaction.

11. The method of claim 10, further comprising storing the transaction identification and charging information related to the transaction.

12. The method of claim 10, further comprising updating a profile for the subscriber based on the transaction.

13. The method of claim 9, wherein receiving the content capability request from the first network provider further comprises receiving a subscriber IP address.

14. The method of claim 13, further comprising determining a network profile for the second network provider of the subscriber including associating the second network to the subscriber based on the subscriber IP address.

15. The method of claim 9, further comprising validating whether the first network provider has a service charging agreement that supports charging for a premium fee in order to guarantee the specified quality of service included in the content capability request.

16. The method of claim 15, wherein when the service charging agreement does not support charging for the premium fee, denying the content capability request.

17. The method of claim 15, wherein when the service charging agreement supports charging for the premium fee, guaranteeing the specified quality of service requested in the content capability request received from the first network provider.

18. A computer-readable storage device having computer program logic recorded thereon, execution of which, by a computing device, causes the computing device to perform operations comprising:

receiving, by a system over a first network provided by the first network provider, a content capability request message, wherein the content capability request message indicates that a provider of content provided network connectivity by the first network provider desires to establish an end-to-end communications path for providing a content delivery session between the content provider and a subscriber at a specified quality of service, and wherein the content capability request message includes a subscriber identifier that identifies the subscriber, wherein the subscriber is provided network connectivity over a second network provided by a second network provider;

transmitting responsive to the received content capability request message, by the system to the second network provider over the second network, a quality of service request message that requests the specified quality of service;

receiving, by the system from the second network provider over the second network, a quality of service confirmation message that indicates the specified quality of service has been applied as a result of the quality of service request message;

forwarding responsive to the received quality of service confirmation message, by the system to the first network provider over the first network, the quality of service confirmation message, wherein the quality of service confirmation message prompts the first network provider to initiate the content delivery session at the specified quality of service;

receiving, by the system from the first network provider over the first network, a forwarded quality of service release message that originates from the content provider and indicates that the content has been delivered from the content provider; and in response to receiving the quality of service release message, forwarding, by the system, the quality of service release message to the second network provider providing the network connectivity to the subscriber to release the specified quality of service and to record a completion of a transaction.

* * * * *